United States Patent
Mu et al.

(10) Patent No.: US 10,643,112 B1
(45) Date of Patent: May 5, 2020

(54) DETECTING CONTENT ITEMS VIOLATING POLICIES OF AN ONLINE SYSTEM USING MACHINE LEARNING BASED MODEL

(71) Applicant: Facebook, Inc., Menlo Park, CA (US)

(72) Inventors: Yang Mu, Fremont, CA (US); Daniel Olmedilla de la Calle, Mountain View, CA (US)

(73) Assignee: Facebook, Inc., Menlo Park, CA (US)

(*) Notice: Subject to any disclaimer, the term of this patent is extended or adjusted under 35 U.S.C. 154(b) by 277 days.

(21) Appl. No.: 15/937,708

(22) Filed: Mar. 27, 2018

(51) Int. Cl.
*G06K 9/00* (2006.01)
*G06K 9/66* (2006.01)
*G06N 20/00* (2019.01)

(52) U.S. Cl.
CPC .......... *G06K 9/66* (2013.01); *G06K 9/00268* (2013.01); *G06N 20/00* (2019.01)

(58) Field of Classification Search
None
See application file for complete search history.

(56) References Cited

U.S. PATENT DOCUMENTS

| 6,854,879 B2 * | 2/2005 | Pavlidis | A61B 5/164 374/45 |
| 8,788,442 B1 * | 7/2014 | Sculley, II | G06N 20/00 706/20 |
| 2008/0260212 A1 * | 10/2008 | Moskal | A61B 5/1079 382/118 |
| 2016/0283975 A1 * | 9/2016 | Kaul | G06Q 50/01 |
| 2018/0218283 A1 * | 8/2018 | Jenson | G06N 20/00 |

* cited by examiner

*Primary Examiner* — Bernard Krasnic
(74) *Attorney, Agent, or Firm* — Fenwick & West LLP

(57) ABSTRACT

An online system distributes content items provided by content providers. The online system determines a likelihood of a content item having deceptive information. The online system stores images showing faces of people in an image database. The online system extracts features from the content item, and provides the extracted features to a machine learning based model configured to generate score indicating whether a content item comprises deceptive information. The machine learning based model uses at least a feature based on matching of faces of users shown in the content item with faces of users shown in the images of the image database. If the online system determines that a content item is deceptive, the online system adds images comprising faces extracted from the content item to the image database to grow the image database.

20 Claims, 4 Drawing Sheets

400

```
┌─────────────────────────────────────────────────┐
│ Receive Request To Determine Whether Content Item │
│              Comprises Deceptive Information      │
│                        410                        │
└─────────────────────────────────────────────────┘
                        ↓
┌─────────────────────────────────────────────────┐
│            Extract Features From Content Item    │
│                        420                        │
└─────────────────────────────────────────────────┘
                        ↓
┌─────────────────────────────────────────────────┐
│  Provide Extracted Features To Model Configured To Generate │
│   Score Indicating Whether Content Item Comprises Deceptive │
│                       Information                 │
│                          430                      │
└─────────────────────────────────────────────────┘
                        ↓
┌─────────────────────────────────────────────────┐
│      Execute Model To Generate Score For Content Item │
│                        440                        │
└─────────────────────────────────────────────────┘
                        ↓
┌─────────────────────────────────────────────────┐
│ Responsive To Generated Score Indicating That Content Item │
│ Comprises Deceptive Information, Determine Whether Content │
│   Item Conforms To Content Policies Of Online System │
│                         450                       │
└─────────────────────────────────────────────────┘
                        ↓
┌─────────────────────────────────────────────────┐
│  Modify Rate Of Distribution Of Content Item Based On The │
│  Determination That The Content Item Violates Content Policies Of │
│                     Online System                 │
│                         460                       │
└─────────────────────────────────────────────────┘
                        ↓
┌─────────────────────────────────────────────────┐
│ Store Images From Content Item In Image Database If Image Was │
│    Not Previously Stored In Image Database        │
│                         470                       │
└─────────────────────────────────────────────────┘
```

FIG. 4

DETECTING CONTENT ITEMS VIOLATING POLICIES OF AN ONLINE SYSTEM USING MACHINE LEARNING BASED MODEL

BACKGROUND

This disclosure relates generally to distribution of content items by an online system, and more specifically to controlling distribution of content items by predicting whether a content item violates policies of an online system using a machine learning based model.

Online systems, for example, social networking systems distribute content received from content providers to users of online systems. Online systems typically enforce certain content policies. An online system may withhold content items violating policies of the online system from users. As an example, of content policy, an online system may prohibit content items that use certain keywords, for example, swear words. As another example, an online system may prohibit certain types of images. An online system may withhold content items violating policies of the online system from users. Another type of content that online systems would like to prohibit is deceptive content, for example, content including links that direct users to an improper external webpages or content whose main purpose is to attract attention and encourage visitors to click on the content item without providing significant information.

Online systems also user automatic techniques to detect content that violates policies of the online system. Such automatic detection is able to identify content items that violate simple policies, for example, presence of certain keywords indicating use of improper language. However these techniques are unable to identify violations of complex policies, for example, whether a content item includes deceptive content. Some online systems use human reviewers to identify content that violates such policies. However review of content by human reviewers is a slow and expensive process. Further human review process can be error prone. Therefore conventional techniques for identifying content violating policies of online systems have several drawbacks.

SUMMARY

An online system distributes content items received from content providers to users of the online system. The online system determines whether a content item violates content policies of the online system and controls distribution of content items based on the determination. The online system may withhold the content item from some or all users if the content item violates certain content policies. A particular content policy enforced by the online system limits distribution of deceptive content, for example, content items that use images of celebrities even though the information presented in the content item does not concern the celebrity. The online system builds a database of images showing faces of people commonly used by content providers in deceptive content.

The online system uses a machine-learning based model to automatically recognize deceptive content. The online system extracts a set of images from the content item, each image representing a face. The online system matches the extracted images against images stored in the image database. The online system sets a feature value based on matching of faces represented the set of images with faces in images stored in the image database. The online system provides the feature as an input to the machine learning based model. The online system executes the machine learning based model to generate a score indicating a likelihood of the content item being deceptive. If the generated score indicates that the content item is likely to be deceptive, the online system determines whether the content item conforms to content policies of the online system, for example, via further verification process. The online system also stores one or more images from the content item in the image database, thereby growing the image database. The online system determines a rate of distribution of the content item to users of the online system based on whether the content item conforms to content policies of the online system.

BRIEF DESCRIPTION OF THE DRAWINGS

FIG. 4 is a flowchart illustrating a process for using the machine learning based model to determine whether a content item violates a content policy of the online system, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of System Environment

Figure 1:
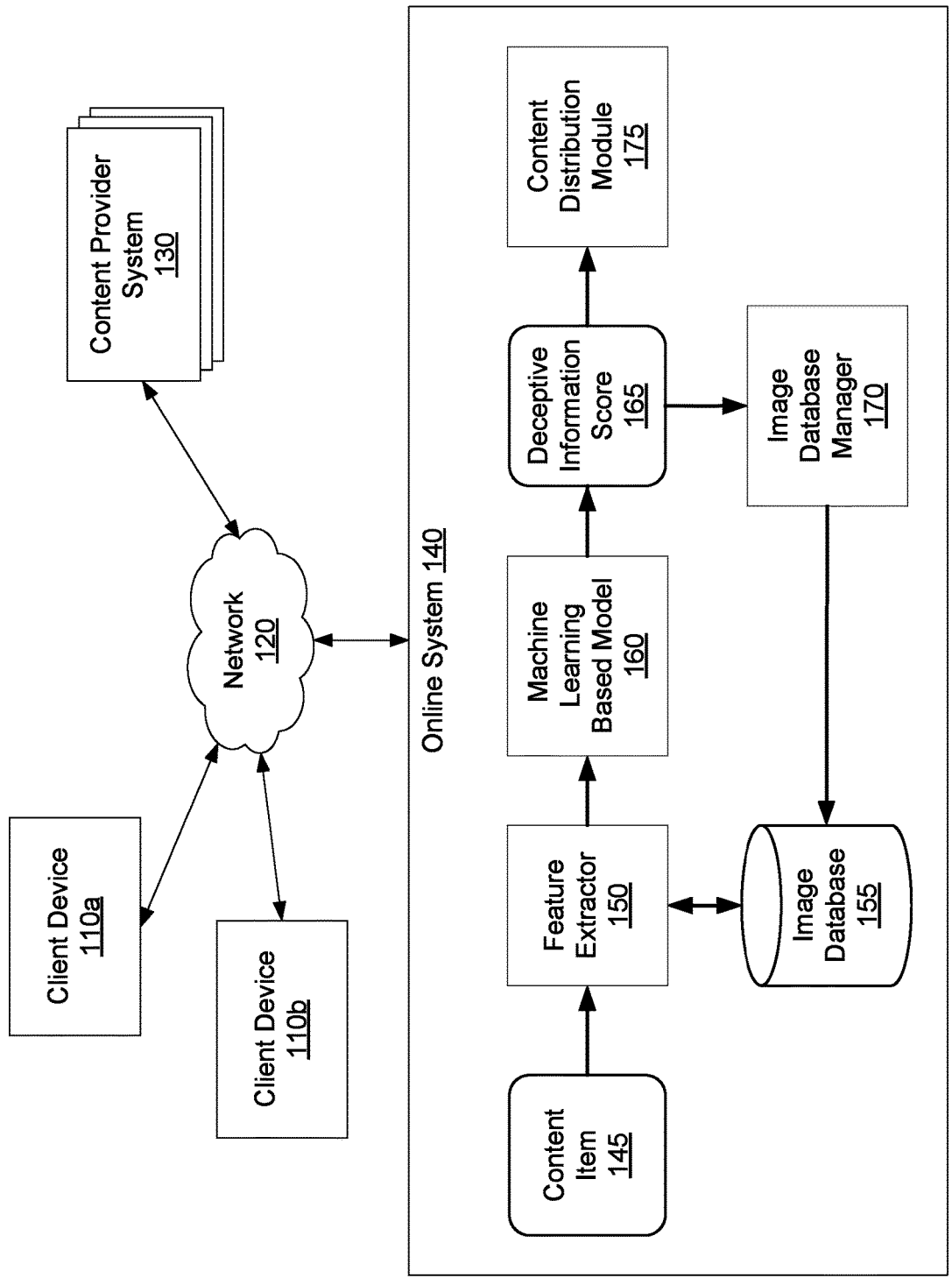
FIG. 1 is a system environment of an online system detecting content items violating policies, in accordance with an embodiment.

FIG. 1 is a system environment of an online system detecting content items violating policies, in accordance with an embodiment. The system environment 100 shown by FIG. 1 comprises one or more client devices 110, a network 120, one or more content provider systems 130, and the online system 140. In alternative configurations, different and/or additional components may be included in the system environment 100. The embodiments described herein can be adapted to online systems that are social networking systems.

The online system 140 receives content items from various sources including users of the content item and content provider systems 130. A content provider system 130 provides content items to the online system 140 for distributing to the users of the online system 140, for example, via client devices 110. The online system enforces content policies that specify that content items distributed by the online system 140 should satisfy certain criteria in order to be eligible for being distributed to all or some of the users of the online system 140. For example, certain content policies may concern how content is displayed. For example, images of the content item should have certain minimum resolution and/or dimensions within certain specified ranges. Some content policies may specify that the language used in the content item should not include certain keywords or should not describe certain topics. Some content policies specify that images and videos should not display certain type of information, for example, nudity or violence.

The online system enforces content policies that require content items to not include deceptive information. A content items including deceptive information is referred to herein as deceptive content item. Deceptive information refers to information, for example, images or text presented by a content item for attracting attention of users, thereby increasing the number of user interactions with the content item. However, the focus of the content presented in the content item is different from the information presented to attract user interactions. For example, a content item may present an image or a celebrity to attract users' attention towards the content item but may present information about another topic, for example, to promote a different topic. The deceptive content may include a small amount of information about the image or text presented to attract user attention but the focus of the content item may be to present information describing a different topic. A deceptive content item may redirect users to a website or a third party content publisher that provides information different from the image or text used to attract attention of users.

The online system 140 determines that a content item is likely to include deceptive information if the content item includes images or videos of certain types of people, for example, celebrities. A celebrity or famous person is an individual who is generally known to the public (e.g., movie stars, government officials, authors, musicians, TV actors, newscasters, etc.). In an embodiment, the online system determines that a user is a celebrity if the user has more than a threshold number of followers (e.g., in a social networking system, users with more than a threshold number of connections in a social graph, such as more than 100, 1000, 10,000, 100,000 connections or followers, etc.). These may be followers of a celebrity account, web page, brand page, blog, news article, etc. The online system uses the presence of certain celebrity images in the content item as an indication that the content item has a high likelihood of being deceptive and perform further verification to confirm whether the content item is deceptive, for example, by manual verification.

The online system 140 receives user interactions via client devices 110. The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) executing on the client device 110.

The client devices 110 are configured to communicate via the network 120, which may comprise any combination of local area and/or wide area networks, using both wired and/or wireless communication systems. In one embodiment, the network 120 uses standard communications technologies and/or protocols. Data exchanged over the network 120 may be represented using any suitable format, such as hypertext markup language (HTML) or extensible markup language (XML). In some embodiments, all or some of the communication links of the network 120 may be encrypted using any suitable technique or techniques. One or more content provider systems 130 may be coupled to the network 120 for communicating with the online system 140.

As shown in FIG. 1, the online system 140 receives a content item 145. The online system may receive the content item 145 from a content provider system 130 or from a user of the online system 140. The online system 140 uses a feature extractor 150 to extract features of the content item 145. A feature associated with a content item describes characteristics of content of the content item, and characteristics of context associated with the content item. Examples of characteristics of content may include textual content (e.g., keywords, phrases, a name or face of a celebrity, a title, a body, an image, an audio, a video, etc.), topics associated with the content (e.g., derived from the textual content), and images used in the content item. Examples of characteristics of context associated with the content item may include information associated with account creator (e.g., celebrity user accounts, a user ID associated with the account creator, the account creator's user profile, the account creator's current location, administrator user ID, etc.), information associated with landing page (LP) (e.g., LP domain, onsite LP ID, offsite LP ID, etc.), and so on. Thus, these characteristics of the content and the context may describe both what the content is and the context in which it was provided for display to users.

One or more features extracted by the feature extractor 150 are based on a matching of images extracted from the content items with images in an image database. The online system determines that an image stored in the image database 155 matches an image extracted from a content item if the face shown in the stored image matches the face shown in the extracted image based on matching of various facial features.

The extracted images and the images in the image database may represent faces of individuals but is not limited to faces of individuals. For example, the images may represent pets or animals that are celebrities. The online system may determine that an entity, for example, an individual user or another living being is popular if the rate of user interactions with content describing the entity exceed a threshold value. For example, the online system may include a user account representing the entity or a web page describing the entity. The online system monitors user interactions associated with the user account or the web page of the entity to determine whether the entity is a celebrity. In an embodiment, the online system may determine that an entity is popular based on expert input. For example, a privileged user identified as an expert may provide a set of images as images of entities known to be popular.

The online system 140 provides the extracted features to a machine learning based model 160 configured to generate a deceptive information score 165 indicating a likelihood of a content item comprising deceptive information. The generated deceptive information score 165 indicates whether a content item is deceptive. For example, the online system may determine that the content items is deceptive if the deceptive information score 165 is above a threshold value.

If the generated deceptive information score 165 indicates that the content item is deceptive, the online system 140 may send the content item 145 for further verification of policy violations by the content item, for example, based on an expert review. The online system 140 sends the content item 145 to a content distribution module 175 that determines a rate of distribution of the content item 145 to users of the online system 140 based on the determination of whether the content item 145 conforms to content policies of the online system 140.

The image database manager 170 further analyzes the deceptive content item to identify other images comprising faces of individuals. The image database manager 170 adds images comprising faces of these individuals to the image database 155 if they were not previously included in the image database 155. This allows the online system to grow the image database.

System Architecture

Figure 2:
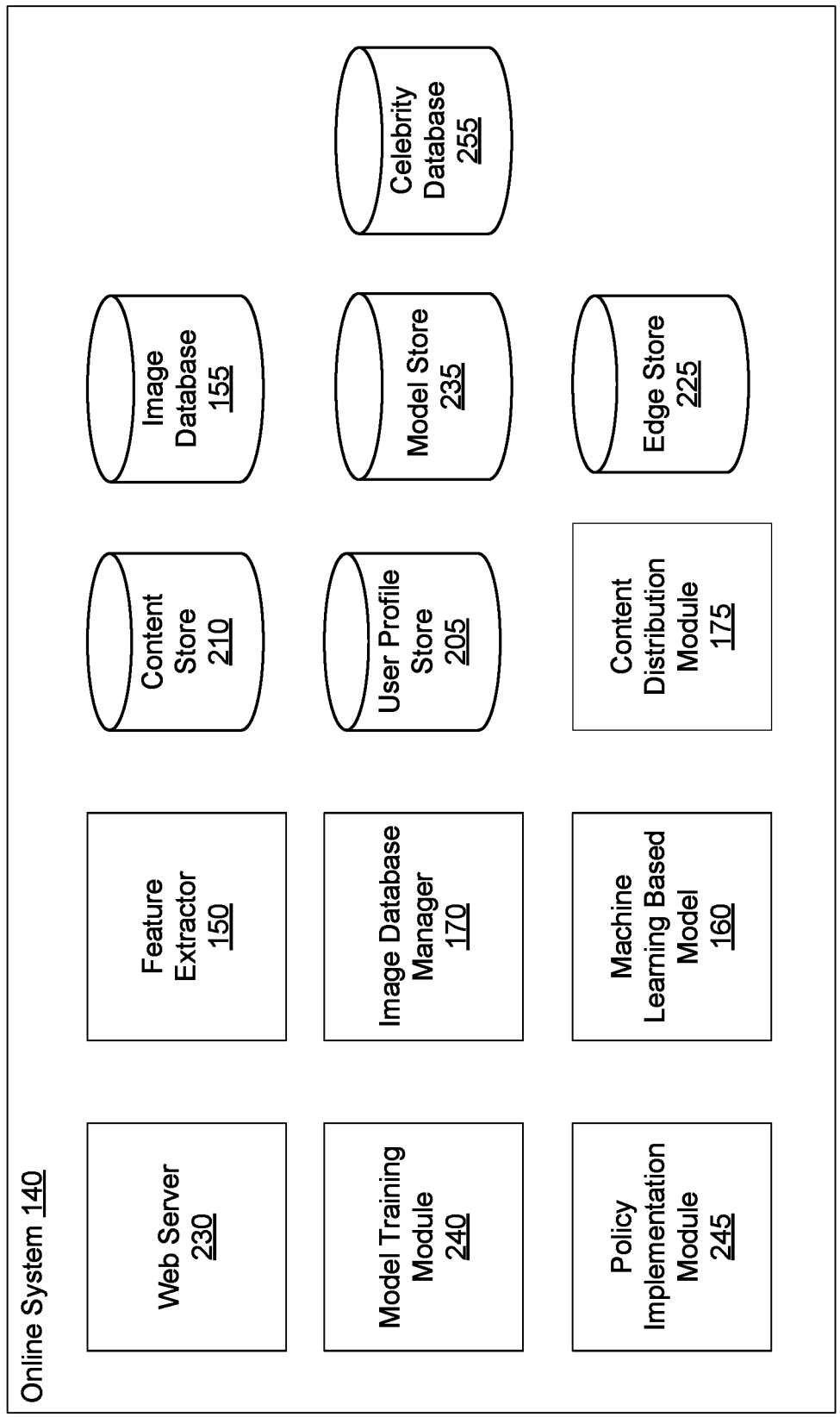
FIG. 2 is a block diagram illustrating the system architecture of an online system, in accordance with an embodiment.

FIG. 2 is a block diagram illustrating the system architecture of an online system, in accordance with an embodiment. The online system 140 shown in FIG. 2 includes a user profile store 205, a content store 210, a web server 230, the feature extractor 150, a model store 235, a model training module 240, a policy implementation module 245, the image database 155, a celebrity database 255, the image database manager 170, the machine learning based model 160, and the content distribution module 175. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in an action log.

The edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Users and objects within the online system 140 can represented as nodes in a social graph that are connected by edges stored in the edge store 225.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In an embodiment, the online system 140 determines that a user is a celebrity based on the edges stored in the edge store 225 associated with the user. The online system 140 may determine that a user is a celebrity if the user account of the user has more than a threshold number of connections. In an embodiment, online system 140 determines that a user is a celebrity if the user account of the user has more than a threshold number of followers, wherein a follower is a user that initiates a request for connection. Accordingly, the user has significantly more connections that were initiated by other users rather than connections that were initiated by the user. In an embodiment, online system 140 determines that a user is a celebrity if the user account of the user is associated with more than a threshold number of user interactions associated with the user account. A user interaction associated with the user account may represent a user interaction performed with content posted by the user account or content associated with the user account, for example, comments posted by other users in connection with the user account of the user. Examples of user interactions with content include accessing the content, forwarding the content, liking the content, recommending the content, posting a comment on the content, and so on. In an embodiment, online system 140 determines that a user is a celebrity if the user account of the user is associated with more than a threshold rate of user interactions associated with the user account.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content items (e.g., the content item 145 as shown in FIG. 1). Hence, the online system 140 encourages users of the online system 140 to communicate with each other by posting text and content items of various types of media through various communication channels. This increases the amount of interaction of users with each other and increases the frequency with which users interact within the online system 140.

The web server 230 links the online system 140 via the network 120 to the one or more client devices 110, as well as to the one or more content provider systems 130. The web server 230 serves web pages, as well as other web-related content, such as JAVA®, FLASH®, XML and so forth. The web server 230 may receive and route messages between the online system 140 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the content store 210. Additionally, the web server 230 may provide application programming interface (API) functionality to send data directly to native client device operating systems, such as IOS®, ANDROID™, WEBOS® or RIM®.

The feature extractor 150 extracts features from a content item received from the content store 210 and/or the content provider system 130. The feature extractor 150 identifies one or more users from the received content item. For example, the feature extractor 150 extracts one or more features associated with an account creator (e.g., a user account, a user ID, etc.). The feature extractor 150 extracts information describing the one or more identified users. Examples of the information include a user account, a user ID, a user profile, a user's name, a user' face image, a user's facial features describing characteristics of a user's face (e.g., eyes, noses, mouth, jaw lines), a user's current location, a user's country, characteristics of content associated with the content item, and characteristics of context associated with the content item.

In various embodiments, the feature extractor 150 identifies facial features of the face of the user from the content item, and determines whether the identified facial features of the face of user match facial features of user accounts stored in the database or match the facial features of a celebrity based on public images of the celebrity. For example, the feature extractor 150 matches positions, sizes, shapes, biometrics, or skin textures of the identified facial features against the facial features of user accounts stored in the database. The system can do a feature-by-feature match, including matching eye features extracted from an image with eye features stored in a database for a particular celebrity, and can get a confidence value on the match. The system can similarly do a feature match for nose, jawline, hair, eyebrows, cheekbones, etc., with different confidence values for each. In some embodiments, a separate machine learning model is trained on each of the features of the face, and outputs a likelihood of a match. These likelihoods or confidence values can be combined to get a total confidence value for the overall facial match that is used to identify whether the image does actually include the celebrity.

In another example, the feature extractor 150 identifies a keyword from the content item. The feature extractor 150 matches the identified keyword against keywords retrieved from a keywords database storing keywords determined to occur in content items with deceptive information.

The feature extractor 150 sets a feature value for each extracted feature based on the matching. For example, if the feature extractor 150 determines that an extracted feature has information that matches the information describing the one or more identified users with the one or more databases, the feature extractor 150 sets a higher value (or a lower value) for that extracted feature than other extracted features.

The model training module 240 trains the machine learning based model 160 using one or more training datasets, each having one or more content items labeled as one of deceptive or not deceptive. The machine learning based model generates a score indicating a likelihood of the content item having deceptive information. For example, the model training module 240 receives one or more training datasets from the one more databases that include content items having no deceptive information. For each content item of the training dataset, the model training module 240 instructs the feature extractor 150 to extract features from the content item. The model training module 240 provides the extracted features to an untrained machine learning based model stored in the model store 235, and executes the untrained machine learning based model to generate a score for the content item. The model training module 240 compares the generated score with a corresponding label associated with the content item, and adjusts weights of the extracted features of the content item, such that features that are more relevant to the expected label associated with the input tend to have higher weight than features that are less relevant to the expected label. This process is repeated iteratively until a difference between a weighted aggregate of feature scores corresponding to the extracted features and the expected label is determined to be below a certain threshold value.

The model training module 240 stores the trained machine learning based model 160 in the model store 235. In an embodiment, the machine learning based model 160 comprises a set of weights associated with various features of an input content item and instructions for processing the features based on the set of weights to obtain the deceptive information score for the input content item.

In some embodiments, the model training module 240 trains the machine learning based model based one or more training algorithms. Examples of training algorithms may include mini-batch-based stochastic gradient descent (SGD), gradient boosted decision trees (GBDT), SVM (support vector machine), neural networks, logistic regression, naïve Bayes, memory-based learning, random forests, decision trees, bagged trees, boosted trees, or boosted stumps.

The policy implementation module 245 enforces content policies on content items distributed by the online system 140. The machine learning based model generates, for each content item, a deceptive information score 165 indicating a likelihood of the content item being deceptive. For example, for each content item, the policy implementation module 245 executes the trained machine learning based model to generate a score. The policy implementation module 245 compares the generated score with various ranges, each range corresponding to actions for the online system 140 to take in response to the content item predicted to have deceptive information. Examples of actions for the online system 140 to take include: disabling or deleting the content item and/or other information associated with the bad campaign (e.g., user ID, content in the content store 210, etc.), ignoring the content item, and additionally reviewing the content item. When a score indicates additional review of the content item, the policy implementation module 245 may compile information to aid in reviewing the content item. For example, the policy implementation module 245 may compile data about how often the content item and the account creator have violated account terms and may organize the data according to the type of account terms that the account and the account creator have violated.

In some embodiments, the policy implementation module 245 determines a range of likelihood scores including the predicted likelihood score of the content item. Based on the range including the predicted likelihood score of the content item, a corresponding action is performed. For example, if the predicted likelihood score is determined to be in a lowest range of likelihood scores, the content item is determined to be less likely to have deceptive information and the content item is allowed to be delivered to the online system's users. If the predicted likelihood score is determined to be in a highest range of likelihood scores, the content item is determined to be highly likely to have deceptive information and the policy implementation module 245 withholds the content item from users of the online system. However, if the predicted likelihood score is determined to be in a mid-level range of likelihood scores, the policy implementation module 245 sends the content item to human reviewers to determine if the content item violates account terms. If the human reviewers determines that the content item violates content policies, the policy implementation module 245 withholds the content item from users of the online system. If the human reviewers determines that the content item does not violate account terms, the policy implementation module 245 marks the content item as being not deceptive and allows the content item to be distributed to the users.

The content distribution module 175 determines a rate of distribution of the content item to users of the online system 140. The rate is based on the determination of whether the content item 145 conforms to content policies of the online system 140, as described with regard to FIG. 1. If the online system 140 determines that the content item 145 does not conform to content policies of the online system 140, the online system 140 performs an action (e.g., disabling or deleting the content item 145). If the deceptive information score 175 indicates that the content item 145 is less likely to include deceptive information, the content distribution module 175 determines a higher rate to distribute the content item 145 to users of the online system 140. If the deceptive information score 175 indicates that the content item 145 is in a range between having no deceptive information and having deceptive information, but the content item 145 is verified by an expert that the content item 145 can be distributed under certain conditions (e.g., the content item 145 can be distributed to a limited number of users, or to users that are located in certain locations, etc.), the content distribution module 175 determines a lower rate to distribute the content item 145 to users of the online system 140. In some cases, the rate may be zero, and the content item may be blocked from any further dissemination, especially if the content is determined to be likely to have deceptive information.

The image database manager 170 performs various operations associated with the image database 155. In particular, the image database manager 170 grows the image database 155 by adding images comprising faces of users. The image database manager 170 adds images comprises faces of users are either determined to be used in deceptive content items or are highly likely to be used in deceptive content items. Accordingly, the image database manager 170 analyzes content items determined to be deceptive and identifies from the content item, images comprising faces that are not have not yet been added to the image database 155 and adds them to the image database.

The feature extractor 150 extracts other features as described herein and provides the extracted features as input to the machine learning based model 160. For example, the feature extractor 150 extracts a feature representing a deceptive information score of an image and provides the feature as input to the machine learning based model 160.

In an embodiment, the image database manager 170 determines a deceptive information score for an image showing a face extracted from the content item. The deceptive information score for an image indicates, a likelihood of content items including the image to be deceptive. For example, certain images are used more regularly in deceptive content items. Accordingly, a presence of these images is a stronger indication that the content item is deceptive. In an embodiment, if an image including the face was previously stored in the image database, the image database manager 170 updates a score associated with the image indicating that the image was observed in another content item determined to be deceptive.

The image database manager 170 stores deceptive information score for images stored in the image database 155. In an embodiment, feature extractor 150 extracts a feature representing a deceptive information score of an image extracted from the content item based on the deceptive information score of a stored image from the image database 155 that matches the extracted image.

The online system 140 comprises a celebrity database 255 storing information describing various celebrities. The information describing a celebrity includes an identifier, name of the celebrity, and a deceptive information score for the celebrity. The deceptive information score for a celebrity represents a likelihood of a content item showing an image of the celebrity being deceptive. The image database associates stored images with various celebrities and determines the deceptive information score for the image based on the deceptive information score for the celebrity (or celebrities) shown in the image. For example, if an image shows a plurality of celebrities, the online system 140 determines the deceptive information score for the image as an aggregate value based on the deceptive information score of each of the plurality of celebrities.

In an embodiment, the feature extractor 150 extracts a feature representing a total number of distinct faces shown in an image of a content item responsive to at least one of the faces in the image matching a face in an image stored in the image database 155. The online system 140 determines the deceptiveness score of the image as a value inversely related to the number of distinct faces shown in the image. For example, if an image shows several faces and only one of the faces shown matches a celebrity, the deceptive information score of the image is lower than that of an image that shows, for example, only the face of the celebrity.

In an embodiment, the deceptive information score for a particular image showing a celebrity face is determined based on a number of distinct deceptive content items that show the matching face. Accordingly, the online system tracks the associations between celebrities and deceptive content items that display images of the celebrities. Accordingly, a celebrity face that is used by a large number of deceptive content items is determined to have a high deceptive information score.

In an embodiment, the deceptive information score for an image showing a celebrity face is a weighted aggregate value based on the content items showing the celebrity face, wherein each content item is weighted by a rate at which the content item is presented to users. Accordingly, content items that are presented at a higher rate are weighted higher than content items that are presented at a lower rate.

Model Training

Figure 3:
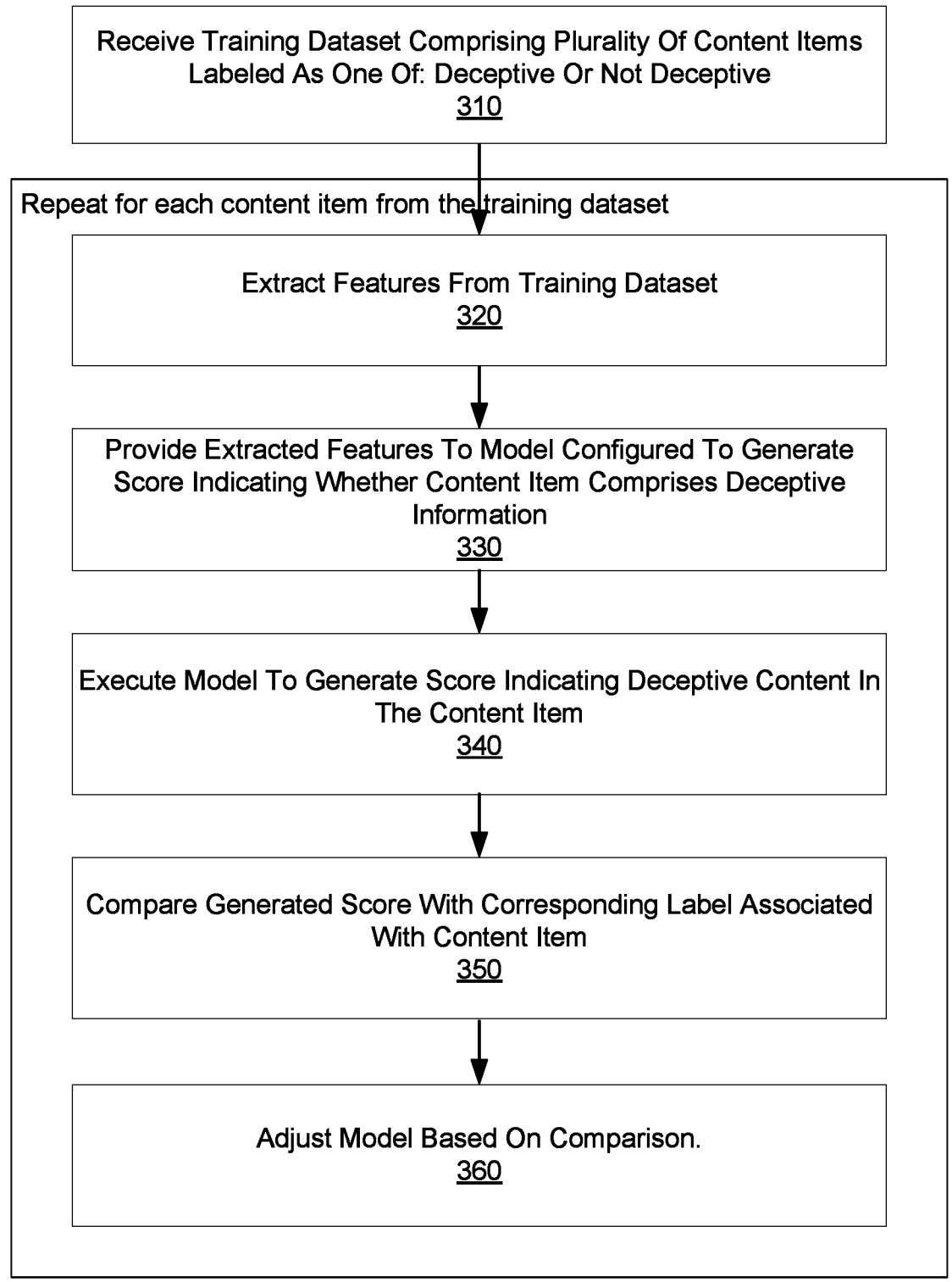
FIG. 3 is a flowchart illustrating a process for training a machine learning based model, in accordance with an embodiment.

FIG. 3 is a flowchart illustrating a process 300 for training a machine learning based model, in accordance with an embodiment. The process 300 may include different or additional steps than those described in conjunction with FIG. 3 in some embodiments or perform steps in different order than the order described in conjunction with FIG. 3.

The online system 140 receives 310 a training dataset having a plurality of content items labeled as one of: deceptive or not deceptive. The labels may be provided by an expert or may be generated based on previous executions of the machine learning based model 160 that may have been verified by a reviewer. The online system repeats the following steps (steps 320, 330, 340, 350, and 360) for each content item.

The online system 140 extracts 320 features from the content item. As part of the step of extraction of the features from the content item, the online system extracts a set of images from the content item, each of the set of images representing a face. For each of the set of images, the online system 140 matches a face represented in the image with faces of images stored in an image database. The online system sets a feature value based on matching of a face represented in at least one of the images extracted from the content item with a face in an image of the image database.

The online system 140 provides 330 the extracted features to a machine learning based model configured to generate score indicating whether content item comprises deceptive information. The online system 140 executes 340 the machine learning based model to generate a score for the content item. The online system 140 compares 350 the generated score with a corresponding label associated with the content item, and adjusts 360 the weights for various features used by machine learning based model based on the comparison. The online system 140 stores the trained machine learning based model 160 in the model store 235.

Content Distribution Based on Machine Learning Based Model

FIG. 4 is a flowchart illustrating a process 400 for using the machine learning based model to determine whether a content item violates a content policy of the online system, in accordance with an embodiment. The process 400 may include different or additional steps than those described in conjunction with FIG. 4 in some embodiments or perform steps in different orders than the order described in conjunction with FIG. 4.

The online system 140 receives 410 a request to determine whether a content item comprises deceptive information. The content item may be a new content item provided by a content provider system 130. The online system 140 extracts 420 features from the content item, as described above with regard to the feature extractor 150 of FIG. 1 and FIG. 2. The online system 140 provides 430 the extracted features to a machine learning based model configured to generate score indicating whether a content item comprises deceptive information.

A feature provided to the machine learning model is determined as follows. The feature extractor 150 extracts a set of images from the content item, each image representing a face. For each of the set of images, the feature extractor 150 matches a face represented in the image with faces of images stored in an image database. The feature extractor 150 sets a feature value based on matching of a face represented in at least one of the images from the set of images with a face in an image of the image database.

The online system executes 440 the machine learning based model to generate the score for the content item. Responsive to the generated score indicating that content item comprises deceptive information, the online system 140 verifies 450 whether the content item conforms to content policies, as described above with regard to the policy implementation module 245 of FIG. 2.

The online system may perform the verification 450 by providing the online system via a user interface to a reviewer. Alternatively, the online system 140 may perform the automatic verification, for example, by using an expert system that performs various types of analysis of the content item to determine whether the content item violates a policy of the online system. In some embodiments the online system determines based on the score generated by the machine learning based model 160 that the content item violates content policies of the online system and accordingly blocks the content item from users in the online system 140.

In some cases, the online system may block the content item entirely from distribution to all users. In other cases, the system may reduce the rate at which the content is sent, if for example, the online system predicts with low confidence that the content item has deceptive information. Since the online system determines that the deceptive information score is in a range of value that indicating that the degree of certainty of the content item being deceptive is not very high, the online system simply reduces the rate of distribution of the content item to users so that fewer users see the content, though the content item is not completely blocked.

In some embodiments, the content system determines the type of action taken in response to determining that a content item is deceptive based on the content policy that is violated. Accordingly, the online system 140 stores a mapping from content policies to types of action performed responsive to determining that the content policy is violated. For example, the online system may determine with a high likelihood that the content item has deceptive content, but the content policy violated does not warrant a strong action, for example, blocking the content item from all users. Instead, the online system may reduce the rate of distribution of the content item or may block the content item from users satisfying a particular criteria based on demographic attributes. For example, the content item may be blocked from users of a particular age group but continue to be distributed to users of other age groups. In some embodiments, the online system 140 sends a message to the content provider that provided the content with recommendations to revise the content item. Accordingly, the content provider system 130 may revise the content item such that the revised content item does not violate the content policies of the online system. The content provider system 130 sends the revised content item to the online system 140 for distribution to the users.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a nontransitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by an online system, a content item for distribution to users of the online system;
   extracting features from the content item, the extracting comprising:
      extracting a set of images from the content item, each image representing a face;
      for each of the set of images, matching a face represented in the image with faces of images stored in an image database, the image database storing images comprising faces; and
      setting a feature value based on matching of a face represented in at least one of the images from the set of images with a matching face in a particular image of the image database;
   providing the extracted features to a machine learning based model configured to generate a score indicating whether the content item comprises deceptive information;
   executing the machine learning based model to generate the score for the content item;
   responsive to the generated score indicating that the content item comprises deceptive information:
      determining whether the content item conforms to content policies of the online system; and
      storing one or more images from the set of images in the image database;
   determining a rate of distribution of the content item to users of the online system based on the determination of whether the content item conforms to content policies of the online system; and
   sending the content item to users of the online system based on the determined rate of distribution.

2. The computer-implemented method of claim 1, wherein the image database stores facial features corresponding to faces represented in the stored images, wherein matching the face represented in the image with faces of images of the image database comprises:
   identifying a first set of facial features of the face represented in the image;
   comparing the first set of facial features with a second set of facial features of a face in an image stored in the image database; and
   responsive to the comparison indicating that a number of facial features of the first set of facial features matching the facial features of the second set is more than a threshold, determining that the match is successful.

3. The computer-implemented method of claim 2, wherein comparing facial features of the face represented in the image with corresponding facial features of faces in an image stored in the image database comprises matching positions, sizes, shapes, biometrics, or skin textures of the identified facial features against corresponding facial features of faces in an image stored in the image database.

4. The computer-implemented method of claim 1, wherein the machine learning based model determines a weighted aggregate of feature scores corresponding to the extracted features from the content item.

5. The computer-implemented method of claim 1, wherein determining whether the content item conforms to content policies of the online system comprises:
   comparing the generated score with a plurality of ranges of scores, each range of scores associated with an action that is performed by the online system in association with the content item; and
   selecting an action corresponding to a range of scores that include the generated score; and
   performing the selected action.

6. The computer-implemented method of claim 5, wherein the action is one or more of: disabling or deleting the content item, or sending the content item for review.

7. The computer-implemented method of claim 1, further comprising, training the machine learning based model, the training comprising:
   receiving a training dataset comprising a plurality of content items labeled as one of:
      deceptive or not deceptive; and
   training the model based on the training dataset.

8. The computer-implemented method of claim 1, wherein determining the rate of distribution of the content item to users of the online system based on the determination of whether the content item conforms to content policies of the online system comprises:
  determining that the content item violates a content policy of the online system; and
  reducing the rate of distribution of the content item, comprising, withholding the content item from users that satisfy certain criteria associated with the violated content policy and continuing to provide the content item to other users.

9. The computer-implemented method of claim 1, further comprising:
  determining a deceptive information score for each of one or more images stored in the image database, the deceptive information score indicative of a likelihood that a content item including the image is deceptive; and
  providing the deceptive information score of the particular image as another feature to the machine learning model.

10. The computer-implemented method of claim 9, wherein the deceptive information score for the particular image showing the matching face is based on a number of content items identified as being deceptive that show the matching face.

11. The computer-implemented method of claim 10, wherein the deceptive information score for the image showing the face is a weighted aggregate value based on the content items showing the face identified in the image, wherein each content item is weighted by a rate at which the content item is presented to users.

12. A non-transitory computer readable storage medium storing instructions which when executed by a computer processor, cause the computer processor to perform steps comprising:
  receiving, by an online system, a content item for distribution to users of the online system;
  extracting features from the content item, the extracting comprising:
    extracting a set of images from the content item, each image representing a face;
    for each of the set of images, matching a face represented in the image with faces of images stored in an image database, the image database storing images comprising faces; and
    setting a feature value based on matching of a face represented in at least one of the images from the set of images with a matching face in a particular image of the image database;
  providing the extracted features to a machine learning based model configured to generate a score indicating whether the content item comprises deceptive information;
  executing the machine learning based model to generate the score for the content item;
  responsive to the generated score indicating that the content item comprises deceptive information:
    determining whether the content item conforms to content policies of the online system; and
    storing one or more images from the set of images in the image database;
  determining a rate of distribution of the content item to users of the online system based on the determination of whether the content item conforms to content policies of the online system; and
  sending the content item to users of the online system based on the determined rate of distribution.

13. The non-transitory computer readable storage medium of claim 12, wherein the image database stores facial features corresponding to faces represented in the stored images, wherein instructions for matching the face represented in the image with faces of images of the image database comprise instructions for:
  identifying a first set of facial features of the face represented in the image;
  comparing the first set of facial features with a second set of facial features of a face in an image stored in the image database; and
  responsive to the comparison indicating that a number of facial features of the first set of facial features matching the facial features of the second set is more than a threshold, determining that the match is successful.

14. The non-transitory computer readable storage medium of claim 12, wherein the machine learning based model determines a weighted aggregate of feature scores corresponding to the extracted features from the content item.

15. The non-transitory computer readable storage medium of claim 12, wherein instructions for determining whether the content item conforms to content policies of the online system comprise instructions for:
  comparing the generated score with a plurality of ranges of scores, each range of scores associated with an action that is performed by the online system in association with the content item; and
  selecting an action corresponding to a range of scores that include the generated score; and
  performing the selected action.

16. The non-transitory computer readable storage medium of claim 12, wherein instructions for training the machine learning based model comprise instructions for:
  receiving a training dataset comprising a plurality of content items labeled as one of:
    deceptive or not deceptive; and
  training the model based on the training dataset.

17. The non-transitory computer readable storage medium of claim 12, wherein instructions for determining the rate of distribution of the content item to users of the online system based on the determination of whether the content item conforms to content policies of the online system comprise instructions for:
  determining that the content item violates a content policy of the online system; and
  reducing the rate of distribution of the content item, comprising, withholding the content item from users that satisfy certain criteria associated with the violated content policy and continuing to provide the content item to other users.

18. The non-transitory computer readable storage medium of claim 12, further comprising:
  determining a deceptive information score for each of one or more images stored in the image database, the deceptive information score indicative of a likelihood that a content item including the image is deceptive; and
  providing the deceptive information score of the particular image as another feature to the machine learning model.

19. The non-transitory computer readable storage medium of claim 18, wherein the deceptive information score for the particular image showing the matching face is based on a number of content items identified as being deceptive that show the matching face.

20. The non-transitory computer readable storage medium of claim 19, wherein the deceptive information score for the image showing the face is a weighted aggregate value based on the content items showing the face identified in the image, wherein each content item is weighted by a rate at which the content item is presented to users.

* * * * *